United States Patent Office 3,020,157
Patented Feb. 6, 1962

3,020,157
PROCESS OF AMMONIATING SYRUP
Walter R. Fetzer, Clinton, Iowa, assignor to Standard Brands Incorporated, New York, N.Y., a corporation of Delaware
No Drawing. Filed July 26, 1956, Ser. No. 600,173
10 Claims. (Cl. 99—2)

This invention relates to a new and improved process for producing an ammoniated sugar-containing product. While the product may well have other uses, one known valuable use therefor is as a feed supplement for ruminants.

The general purpose of the invention is to make available in the product a higher percentage of readily assimilable or utilizable nitrogen than was present in the original sugar-containing material, without unnecessarily diminishing the percentage of sugars therein. Furthermore, when the product is used as a feed supplement for ruminants, especially with roughages having cellulosic materials which are digested with difficulty, the combination of sugars and assimilable nitrogen provides readily available food for the microorganisms of the rumen which in turn digest the cellulosic roughage and make it available to the animal. The total result is greater utilization of the cellulosic material than the rumen could otherwise achieve and under conditions entirely beneficial to the ruminant.

While the broad idea of ammoniating sugar-containing materials for various purposes is old, no prior application of this idea has yielded a product as suitable for my purpose as does this invention.

The general object of the invention is to provide a feed supplement for ruminants by utilizing a sugar-containing material normally having a high reducing sugar content but a low protein content and ammoniating it in such a manner as to substantially increase its protein-equivalent nitrogen content without needless loss of the reducing sugars.

In the practice of my invention I may use various sugar-containing liquors but prefer some which are, in their normal condition, of a lower market value. Among these is citrus molasses, a by-product of the citrus juice industry. Another is hydrol, a well known by-product of corn sugar refining processes. Also blackstrap molasses may be used as the sugar liquor to be ammoniated. Other sugar-containing products, allied with corn sugar refining, may be used when suitable and if their use is economical. Wood sugars and wood sugar-containing liquors may also be treated advantageously in accordance with this invention.

Among the important features of the invention are the following. The ammonia is added under such condition of rate, temperature, and amount that it is all promptly reacted with the sugar in chemical combination; thereby avoiding loss of ammonia to the atmosphere. An acidic material is added, simultaneously if desired, or otherwise at such a rate and proportion that the reaction mixture is maintained within the pH limits of 4.0 to 7.5. If, as in some processes, the pH should fall below pH 4.0, extensive acid reversion or repolymerization of the sugars would take place, whereby the reducing sugar content would be decreased more than is desired. If, on the other hand, the pH is permitted to rise above about 7.5, alkaline degradation to sugar acids sets in, with an attendant loss of sugar substance.

The sugar-containing starting material conveniently should be in liquid or syrup state and preferably at a high density, or low moisture content, for economy in processing, handling and shipping.

A feature of primary importance in my process is that the ammoniation of the syrup be conducted within a carefully controlled pH range lower than has characterized other but unrelated ammoniation processes. Excessive concentration of ammonia and excessive total use of ammonia is avoided for accuracy of control, maintenance of optimum conditions, improvement of the desired yield, and economy.

I find that by ammoniating the sugar-bearing material within a controlled pH range, a stable product results which can be shipped and stored without deterioration. It is also uniformly palatable to ruminants. Both of these are valuable properties not always found in other ammoniation sugar products made by other processes.

While the chemical mechanism of the process is not known, it is believed that the ammonia first reacts with the carbonyl group of the sugar to produce an aldehyde ammonia complex and that through subsequent heating, at controlled pH, the ammonia group passes on down the carbon chain to the next carbon atom, forming an amino sugar. In the case of dextrose, this would be a glucosamine, 2-aminoglucose. The careful control of heating conditions and pH in accordance with the teachings of this specification, permits this reaction to proceed with a minimum destruction of these valuable end-products.

The relatively small amount of color which develops during my process serves clearly to differentiate visually between my process and other known contemporary processes involving the reaction between ammonia and sugar substances.

By means of this invention I am able to produce an ammoniated sugar syrup with a minimum increase in color, in contrast with prior processes involving ammoniation of sugar which resulted in a large amount of darkened colors or burnt sugar coloring. The product of my process may well have a final tinctorial power not more than 3 to 5 greater than its original color, in contrast with other known ammoniated sugar products having final tinctorial powers of 30 or more.

Another feature of this invention is that in the course of obtaining a high nitrogen content I ammoniate the sugar syrup with substantial amounts of ammonia but under such controlled rates and within such a pH range that a stable syrup results, having little tendency toward crystallizing, jellying and solidifying.

The ammonia to be employed may be furnished by the use of anhydrous ammonia, aqueous ammonia or from such ammonium salts as may be employed in control of the pH, as well as from any combination of these sources of ammonia.

The addition of the ammonia and the acidulating agent are so regulated and proportioned as to maintain the syrup in the pH range of 4.0 to 7.5, preferably not over 7.0, during the reaction between the ammonia and the syrup, and this pH control appears to exercise a desired definite control over the course of the chemical reactions, particularly in the reaction of the ammonia with the dextrose molecules.

The process of my invention involves the addition of the ammonia in the proportion of between 1.0% and 5.5%, based on the dry substance weight of the sugars present in the syrup being treated. More than 5.5% of ammonia may be used, but, in view of the fact that difficulty in control of the process would increase, such higher percentages are not recommended. Less than 1% of ammonia would not yield the increase in crude protein equivalent which usually would be desired. The ammonia is added continuously or in small increments. The acidic material is added so that the pH is maintained within a range of 4.0 to 7.5 pH. An ammonium salt, such as ammonium sulfate, ammonium chloride, ammonium phosphate, ammonium carbonate, or ammonium bi-carbonate, may be used to supply the acidulating agent and part of the ammonia. If desired, a free acid such as hydrochloric, sulphuric or phosphoric acid could be used in addition to or without the ammonia salt, and all of the ammonia employed, or most of it, could be added as ammonia.

The process, furthermore, consists in the addition of ammonia and acidic material to sugar-bearing materials under conditions of temperature and pH favorable to the production and stability of what is thought to be, in the case of dextrose-rich materials, glucosamine. Such a process results in a maximum of final nitrogen-bearing reducing sugars and a minimum of sugar degradation in the ammoniated product.

The temperature range during the reaction is subject to considerable variation. As is expected with most chemical reactions in aqueous media, time and temperature are related in inverse proportion below the boiling point, while time, temperature and pressure are similarly related above the boiling point.

The process is preferably performed in a closed reaction vessel or kettle, primarily to prevent the loss of ammonia gas. Such a vessel may be a jacketed kettle six feet in diameter and approximately twenty feet in depth, equipped with an agitator. The ammonia system consists of an ammonia cylinder on a dial type weighing scale, connected through a flexible hose to an iron pipe system leading to the reaction kettle. A shut off valve is a part of the cylinder assembly; and another shut off valve is at the kettle. The pipe system in the kettle consists of a pipe leading to a circular ring in the bottom of the kettle which is provided with a large number of small holes. There is an additional small hole 1/64 of an inch in diameter in the top of the pipe below the inner surface of the kettle and above the liquid level. The acid or ammonium salt is added gradually in any appropriate manner which will avoid localized over-acidulation.

In performing the process of this invention, any one of various sugar-containing syrups may be used, but for purposes of economy I prefer to start with a low-grade sugar product such as corn sugar molasses (hydrol), citrus molasses, cane or beet molasses, wood sugars and liquors containing wood sugar or the like.

The ratio between the ammonia and the acidic material required to maintain the required pH range may be affected by the buffer power of the syrup, and therefore, alterations must be made where necessary to compensate for changes in the buffering capacity of the syrup being treated.

In operation, the sugar-bearing material is placed in the reaction kettle described above, and heated by any convenient means, such as steam on the jacket, preferably to a temperature within the range of 140° F. to 220° F. Starting materials in the density range of 39° to 45° Bé., or 73° to 85° Brix, are preferred for convenience in pumping, stirring and general economy, and materials at such densities are conveniently treated in this process in the range of 140° F. to 220° F., although any temperature from ambient to 220° F. may be employed.

If desired, part or all of the chemical reagents may be added to the cold sugar bearing material before this is heated, but it is more convenient to add at least that part of the ammonia required in excess of the stabilizing salts after the mass has been warmed.

The desired quantity of liquid ammonia is fed into the pipe and the major part thereof evolves as gas through the ammonia distributing ring and some through the small orifice at the top of the pipe system. The liquid ammonia in changing from a liquid to a gas within the system obtains its latent heat of vaporization from the syrup, which offsets some of the temperature increase resulting from the heat of reaction. When the desired weight of ammonia has been added, the cylinder valve is closed, the liquid ammonia in the pipe system allowed to complete its evaporation as gas in the kettle, and the valve adjacent the kettle is closed. The small orifice in the top of the pipe system prevents a flashback of sugar produced by the rapid absorption of the ammonia by the sugar syrup.

After the chemicals have been added the mixture is held at the reaction temperature until the desired reactions have been obtained. Thereafter the product needs only to be cooled and will remain stable. The final product realized is stable under normal room temperature conditions with respect to ammonia release over the pH range 4.0–7.5 and is essentially free from untoward decomposition products.

Having described the principles of my invention, I will illustrate its practice by examples. The analyses reported in the following examples were performed by the methods of the Association of Official Agricultural Chemists where applicable. The pH determinations were made on the syrups at full concentration, without dilution. Colors were determined at a dilution of 1:1000, the light passing through one inch of solution, and measured by the Lovibond caramel color series No. 52. By "crude protein," in all cases, is meant nitrogen as determined by a Kjeldahl method, multiplied by the factor 6.25.

*Example 1*

Corn sugar hydrol was ammoniated at 200°–220° F. as follows:

Hydrol, as defined by analysis below ____pounds__ 1000
Hydrochloric acid (calculated as anhydrous HCl)
    pounds__ 24
Anhydrous ammonia, $NH_3$ _____do____ 29
Time for addition of chemicals _____minutes__ 30
Time of heating after chemical additions __do____ 30

Cool to below 100° F.

|  | Analyses | |
| --- | --- | --- |
|  | Before treatment | After treatment |
| Dry substance, percent | 73.5 | 69.8 |
| Reducing Sugars, dry basis, percent | 73.4 | 59.0 |
| Total crude protein equivalent, D.B., percent | 0.3 | 24.6 |
| Uncombined $NH_3$ calc'd as protein, D.B., percent |  | [1] 10.3 |
| pH | 4.4 | 7.3 |
| Color | 2.0 | 3.0 |

[1] 1.8 as $NH_3$.

*Example 2*

Citrus molasses was ammoniated at 200°–220° F. as follows:

Citrus molasses _____pounds__ 1000
Ammonium sulfate (containing 14.5 pounds of
  $NH_3$) _____pounds__ 56.2
Anhydrous ammonia _____do____ 14.5
Time for addition of chemicals _____minutes__ 30
Time of heating after chemical additions __do____ 30

Cool to below 100° F.

|  | Analyses | |
| --- | --- | --- |
|  | Before treatment | After treatment |
| Dry substance, percent | 72.2 | 69.6 |
| Reducing Sugars, dry basis, percent | 27.7 | 15.8 |
| Sucrose, dry basis, percent | 30.2 | 27.6 |
| Total Crude protein equivalent, D.B., percent | 7.1 | 27.1 |
| Uncombined $NH_3$ calculated as protein, D.B., percent |  | 11.8 |
| pH | 4.4 | 5.5 |
| Color | 0.2 | 2.0 |

*Example 3*

Blackstrap molasses was ammoniated at 200°–220° F. as follows:

Blackstrap molasses _____pounds__ 1000
Ammonium sulfate (16.2 pounds of NH₃) _do____ 62.7
Anhydrous ammonia _____do____ 13.2
Time for addition of chemicals _____minutes__ 30
Time of heating after chemical additions __do____ 30
Cool to below 100° F.

|  | Analyses | |
| --- | --- | --- |
|  | Before treatment | After treatment |
| Dry substance, percent | 73.5 | 71.7 |
| Reducing sugars, dry basis, as dextrose, percent | 24.6 | 10.2 |
| Sucrose, percent | 44.4 | 41.2 |
| Total crude protein equivalent, D.B., percent | 3.4 | 23.5 |
| Uncombined NH₃, calc'd as protein, D.B., percent |  | 10.9 |
| pH | 5.0 | 6.5 |
| Color | 4.0 | 6.0 |

*Example 4*

Corn sugar hydrol was ammoniated at 150°–160° F. as follows:

Hydrol as defined by analysis below ____pounds__ 5342
Di-ammonium phosphate _____do____ 50
Ammonium chloride _____do____ 154
Aqueous ammonia (28% NH₃) _____do____ 336
Time for addition of chemicals _____minutes__ 63
Time of heating after chemical addition ___do____ 102
Cool to 120° F.

|  | Analyses | |
| --- | --- | --- |
|  | Before treatment | After treatment |
| Dry substance, percent | 84.0 | 77.8 |
| Reducing sugars, dry basis, percent | 73.8 | 61.1 |
| Total crude protein equivalent (dry basis), percent | 0.3 | 18.6 |
| Uncombined ammonia calc'd as protein (dry basis), percent |  | 7.4 |
| pH | 4.2 | 6.85 |
| Color | 1.0 | 1.6 |

The products of the foregoing process are stable syrups of low moisture content having the desirable features and advantages described above. They may be fed to ruminants in liquid form or mixed with other appropriate feeds preliminary to feeding.

If the starting material has a density in the range of 39° to 45° Bé., or 73°–85° Brix, the reactions proceed readily and economically under the prescribed conditions, and a uniform product results which needs no after-treatment. As all of the ammonia is utilized in the chemical reactions, no excess ammonia vapor needs to be disposed of or recovered in any manner. It will be noted from the described examples that the nitrogen content of the syrup is very substantially increased, to an extent recognized as significant and useful for a ruminant feed supplement. While the reducing sugars are necessarily decreased in the process to a substantial extent, this invention makes it possible to retain in the finished product more than 35% of the reducing sugars originally present when any of the aforementioned sugar-containing materials are treated in this process, whereas when hydrol is employed as the starting material more than 50% of the original reducing sugars are retained. Such retention of reducing sugars along with the gain in protein are regarded in the industry as novel and useful achievements.

Lower densities or concentrations than 39° Bé. may be employed and will react satisfactorily, but for purposes of economy, I prefer to start with products of as high a concentration as will give readily workable viscosities. If the product is made at a lower Bé. and then is to be stored for any considerable period of time, it should be concentrated to above 39° Bé. to prevent fermentation.

This application is a continuation-in-part of my application Serial No. 375,552, filed August 20, 1953, now abandoned.

While preferred methods of practicing the invention have been described above, it should be understood that the invention is subject to some variation without departure from the scope of the invention, as defined in the appended claims.

I claim:

1. A method of treating a sugar-containing aqueous syrup, comprising gradually adding to and dispersing ammonia vapor in a body of the syrup having a temperature in the range of ambient temperatures to 220° F., adding an acidic material to the mixture in such proportion as to maintain the mixture during the reaction period within a pH range of 4.0 to 7.5, and terminating the treatment when the nitrogen content of the mixture resulting from chemical reaction has substantially increased, the weight of ammonia employed (calculated as anhydrous NH₃) being between 2% and 5.5% of the dry substance weight of the sugars initially present.

2. A method of treating a sugar-containing aqueous syrup having a density greater than 39° Bé., comprising gradually adding to and dispersing ammonia vapor in a body of the syrup heated to a temperature range of ambient temperatures to 220° F., adding an acidic material to the mixture in such proportion relative to the ammonia and syrup as to maintain the mixture within a pH range of 4.0 to 7.5, and terminating the treatment when the nitrogen content of the mixture resulting from chemical reaction has substantially increased, the weight of ammonia employed (calculated as anhydrous NH₃) being between 2% and 5.5% of the dry substance weight of the sugars initially present.

3. A method of treating corn sugar hydrol, comprising gradually adding to and dispersing ammonia in a body of the hydrol having a temperature of 140 to 220° F. while adding thereto an acidic material in such proportion as to maintain the pH of the mixture within the range of 4.0 to 7.5, and continuing the treatment until the crude protein equivalent (N×6.25) of the mixture resulting from the chemical reaction is increased to at least about 20%, the weight of ammonia employed (calculated as anhydrous NH₃) being between 2% and 5.5% of the dry substance weight of the sugars initially present.

4. A method of treating a dextrose-containing aqueous syrup, comprising adding ammonia and an acid gradually and in small increments to the syrup in a manner so controlled as to maintain the pH of the syrup within a range of 4.0 to 7.5 and at a mixture temperature between ambient temperatures and 220° F. in such relative proportions that substantially all of the ammonia is reacted with the mixture and the crude protein equivalent of the mixture is increased to at least about 20%, the weight of ammonia employed (calculated as anhydrous NH₃) being between 2% and 5.5% of the dry substance weight of the sugars initially present.

5. A method of treating a dextrose-containing aqueous syrup, comprising gradually adding ammonia to a body of the syrup having a temperature between ambient temperatures and 220° F. thereby substantially instantaneously vaporizing the ammonia, gradually adding an acidic material to the mixture in such proportions as to maintain the pH of the mixture in the range of 4.0 to 7.5 while under treatment, continuing said treatment until the reaction has substantially increased the nitrogen content of the mixture, and terminating the addition of ammonia and acid while the mixture is still in said pH range, and cooling the same to ambient temperatures, the weight of ammonia employed (calculated as anhydrous NH₃) being between 2% and 5.5% of the dry substance weight of the sugars initially present.

6. A method of treating sugar containing aqueous syrup selected from the group consisting of corn sugar hydrol, crude corn sugars, citrus molasses, cane sugar molasses, and beet sugar molasses, comprising gradually adding to and dispersing ammonia vapor in a body of the syrup having a temperature in the range of ambient temperatures to 220° F., simultaneously adding an acidic material to the mixture in such proportion as to maintain the mixture within a pH range of 4.0 to 7.5 while under treatment, and terminating the treatment when the nitrogen content of the mixture resulting from chemical reaction has substantially increased, the weight of ammonia employed (calculated as anhydrous $NH_3$) being between 2% and 5.5% of the dry substance weight of the sugars initially present.

7. A method of treating sugar containing aqueous syrup selected from the group consisting of corn sugar hydrol, crude corn sugars, citrus molasses, cane sugar molasses, and beet sugar molasses, comprising gradually adding to and dispersing ammonia in a body of the syrup having a density between 39° and 45° Bé. and having a temperature between ambient temperatures and 220° F. while simultaneously adding thereto acid in such proportion as to maintain the pH of the mixture within the range of 4.0 to 7.5 while under treatment, and continuing the treatment until the crude protein equivalent ($N \times 6.25$) of the mixture resulting from the chemical reaction is increased to at least about 28%, the weight of ammonia employed (calculated as anhydrous $NH_3$) being between 2% and 5.5% of the dry substance weight of the sugars initially present.

8. A method of treating sugar containing aqueous syrup selected from the group consisting of corn sugar hydrol, crude corn sugars, citrus molasses, cane sugar molasses, and beet sugar molasses, comprising gradually adding to and dispersing ammonia vapor in a body of the syrup having a temperature in the range between ambient temperatures and 220° F., adding an acidic material to the mixture in such proportion as to maintain the mixture within a pH range of 4.0 to 7.5 while under treatment, and terminating the treatment when the nitrogen content of the mixture resulting from chemical reaction has substantially increased, said acidic material being selected from the group consisting of ammonium chloride, ammonium sulfate and ammonium phosphate, the weight of ammonia employed (calculated as anhydrous $NH_3$) being between 2% and 5.5% of the dry substance weight of the sugars initially present.

9. A method of treating a sugar-containing aqueous syrup, comprising gradually adding to and dispersing ammonia vapor in a body of the syrup having a temperature in the range of 200 to 220° F., adding an acidic material to the mixture in such proportion as to maintain the mixture while under treatment within a pH range of 4.0 to 7.5, and terminating the treatment when the nitrogen content of the mixture resulting from chemical reaction has substantially increased, the weight of ammonia employed (calculated as anhydrous $NH_3$) being between 2% and 5.5% of the dry substance weight of the sugars initially present.

10. In the ammoniation of sugar-containing aqueous syrups for production thereby of nitrogen-bearing compounds readily assimilable by ruminants, wherein the weight of ammonia employed (calculated as anhydrous $NH_3$) is between 2% and 5.5% of the dry substance weight of the sugars initially present, the step of controlling the course of the chemical reactions between the ammonia and syrup by adding acidic material to the mixture in such proportion as to maintain the pH of the mixture in the range of 4.0 to 7.5 during said reaction.

References Cited in the file of this patent

UNITED STATES PATENTS

| | | |
|---|---|---|
| 2,197,540 | Klug | Apr. 16, 1940 |
| 2,603,567 | Stiles | July 15, 1952 |